Patented July 7, 1953

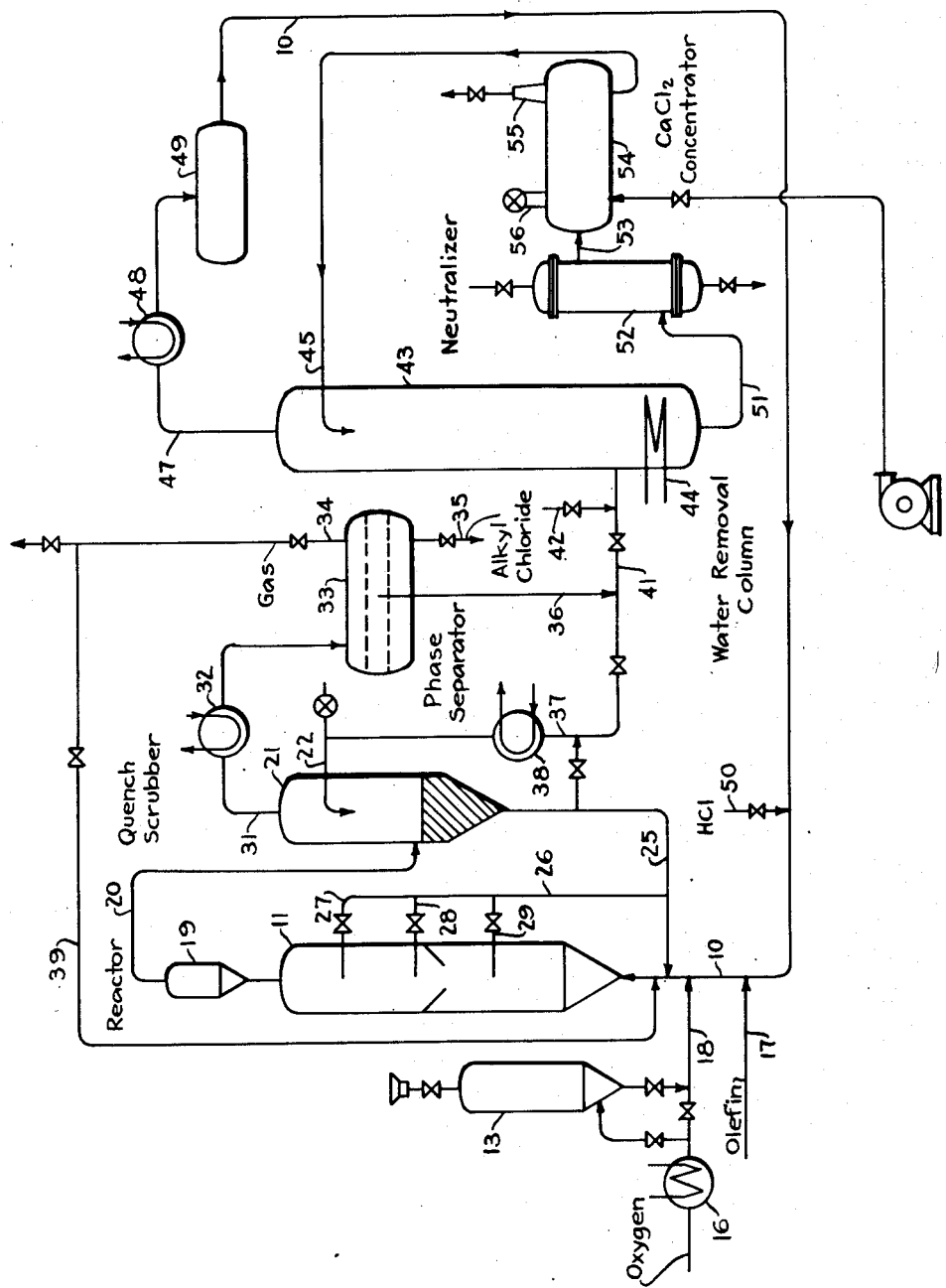

2,644,846

UNITED STATES PATENT OFFICE 2,644,846

HYDROGEN CHLORIDE OXIDATION

Ava J. Johnson, Oakland, and Alexander J. Cherniavsky, San Francisco, Calif., assignors to Shell Development Company, San Francisco, Calif., a corporation of Delaware Application December 11, 1948, Serial No. 64,746

9 Claims. (Cl. 260—659)

This invention relates to improvements in the execution of processes wherein chlorine is produced by the interaction of oxygen and hydrogen chloride. The invention relates more particularly to improvements in the execution of processes wherein oxygen and hydrogen chloride are caused to interact in the presence of a metal halide of variable valence. A particular aspect of the invention relates to improvements in the execution of processes wherein chlorine is produced by the interaction of oxygen and hydrogen chloride in the presence of copper chloride and an organic acceptor for the chlorine produced.

Hydrogen chloride is produced as a by-product in a great number of commercial processes. Often the hydrogen chloride thus unavoidably produced exceeds the need for this material as such, thereby not only militating against practical operation of these processes but creating serious and costly disposal problems. Economical operation of many other processes is dependent upon the availability of a supply of chlorine where by-product hydrogen chloride is readily obtainable. Consequently, methods enabling the efficient conversion of hydrogen chloride to chlorine have become of primary importance. One method of converting hydrogen chloride to chlorine comprises contacting the hydrogen chloride in admixture with oxygen, or an oxygen-containing gas, with a metal chloride of variable valence, such as copper chloride, at an elevated temperature, resulting in the production of reaction products containing chlorine and water. The process may be represented by the basic equation:

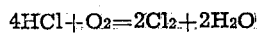

$$4HCl + O_2 = 2Cl_2 + 2H_2O$$

Modifications of the process comprise those wherein the hydrogen chloride oxidation reaction is carried out in conjunction with another reaction in which an additional reactant functions as an acceptor for the chlorine within the system. Thus an olefinic hydrocarbon may be added to the hydrogen chloride-oxygen mixture charged to the reaction zone thereby obtaining simultaneous chlorination of the added olefin. Such modified operation not only provides a solution to the hydrogen chloride disposal problem but enables the simultaneous production of highly desirable chlorinated hydrocarbons.

These methods have been handicapped, however, by serious disadvantages militating against application of the process on a practical scale. These difficulties are occasioned to at least a substantial degree by the relatively high exothermic heat liberated during the course of the hydrogen chloride oxidation reaction rendering control of suitable reaction temperatures within the reaction zone extremely difficult and often impossible. Execution of the reaction in the presence of an organic chlorine acceptor increases substantially the heat liberation thus increasing the heat removal problem. Expedients such as, for example, the introduction of cooling media such as water directly into the reaction zone from an external source have proven unsatisfactory. This often not only has a deleterious effect upon physical structure of the catalyst employed but tends to reduce its catalytic effect. Even more serious difficulties often occasioned by such addition of cooling media, such as water, from a source outside the system are the operational difficulties and increased equipment costs occasioned thereby since the volume of material handled is substantially increased and product separation is rendered decidedly more complex due to the need for separating water from greater quantities of hydrogen chloride-water constant boiling mixture. Further difficulties in such processes available heretofore are often occasioned by inability to cope with volatilization and entrainment of catalyst from the reaction zone. Removal of catalyst from the reaction zone by entrainment is often encountered to such a degree that the absence of operational procedures to return the entrained metal halide to the reaction zone results in rapid decline of efficiency of operation below that commensurate with practical operation. Catalyst entrainment as encountered in such processes generally employed heretofore further renders exceedingly difficult the cooling of the reactor effluence. The entrained catalyst not only clogs the indirect cooling systems through which the reactor effluence is passed but entails additional serious difficulties relating to catalyst separation from the cooled reactor effluence.

Realization of the advantages inherent in the use of the presently available improved catalysts of the fluid type and of relative pure oxygen, now economically available, in place of the oxygen-containing gas generally used in such processes has heretofore generally been impossible due to the substantial aggravation of catalyst entrainment, and the temperature control and product separation difficulties thereby occasioned.

It is an object of the present invention to provide an improved process enabling the more efficient execution of catalytic reactions comprising the oxidation of hydrogen chloride in the presence of a metal chloride.

Another object of the invention is the provision of an improved process enabling the more efficient production of chlorine by the interaction of oxygen and hydrogen chloride in the presence of a metal halide of variable valence and an organic chlorine acceptor.

Another object of the invention is the provision of an improved process enabling the more efficient oxidation of hydrogen chloride with the aid of copper chloride in the presence of an olefinic hydrocarbon.

A further object of the invention is the provision of an improved process enabling the more efficient production of chlorine by the oxidation of hydrogen chloride in the presence of copper chloride and in the presence of ethylene functioning as an acceptor for the chlorine produced.

A still further object of the invention is the provision of an improved process enabling the more efficient production of ethylene dichloride from charge materials comprising ethylene, hydrogen chloride and oxygen or an oxygen-containing gas. Other objects and advantages of the invention will become apparent from the following detailed description thereof.

In accordance with the process of the invention, reactants comprising hydrogen chloride and oxygen, or an oxygen-containing gas, are contacted with a chloride of a metal of variable valence at an elevated temperature in a reaction zone thereby effecting the interaction of hydrogen halide and oxygen with the formation of reaction products comprising chlorine and water. Reaction products comprising chlorine, water and unconverted hydrogen chloride together with a portion of the catalyst is taken from the reaction zone and passed into a quenching zone. Within the quenching zone, the catalyst-containing reaction products are brought into direct contact with liquid aqueous hydrogen chloride thereby separating a liquid phase comprising aqueous hydrogen chloride containing substantially all of the catalyst introduced into the quenching zone from a gaseous phase comprising chlorine, hydrogen chloride and water free of any substantial amount of catalyst. The catalyst-containing liquid phase is passed from the quenching zone into the reaction zone. The catalyst-free gaseous phase is passed through a cooler, wherein substantially all of the aqueous hydrogen chloride present in the stream is condensed, into a separation zone. In the separating zone, a liquid phase comprising aqueous hydrogen chloride is separated from a gaseous phase comprising chlorine. A portion of the liquid phase is passed from the separating zone into the quenching zone to be used as the quenching medium therein. The remainder of the liquid phase is passed from the separating zone to suitable dehydrating means wherein at least a substantial part of the water is removed therefrom and the dehydrated hydrogen chloride is recycled to the reaction zone. The gaseous phase is taken from the separating zone as a final product.

In a preferred method of carrying out the invention, the oxidation of the hydrogen chloride is executed in the presence of an organic chlorine acceptor. To this effect a suitable organic chlorine acceptor such as, for example, an olefinic hydrocarbon, is introduced into the reaction zone in addition to the hydrogen chloride and oxygen, or oxygen-containing gas. Under the hydrogen chloride oxidizing conditions the olefinic hydrocarbon will react with the chlorine substantially as rapidly as it is formed with the formation of organic chlorides consisting essentially of the chlorine addition product of the olefin. Reaction products consisting essentially of organic chlorides, unconverted hydrogen chloride and water, and a portion of the catalyst are passed from the reaction zone into the quenching zone wherein they are brought into direct contact with liquid aqueous hydrogen chloride resulting in the formation of a liquid phase consisting essentially of aqueous hydrogen chloride containing all of the entrained catalyst introduced into the quenching zone and a vapor phase comprising organic chlorides, water and hydrogen chloride. The catalyst-containing liquid phase is passed from the quenching zone to the reaction zone. The catalyst-free vapor phase is passed from the quenching zone through a cooler wherein it is cooled to a temperature sufficiently low to condense substantially all organic chlorides and aqueous hydrogen chloride, into a separating zone. A liquid phase consisting essentially of organic chlorides, a separate liquid phase consisting essentially of aqueous hydrogen chloride, and a gaseous phase comprising unconverted chloride, in addition to any normally gaseous materials introduced into or formed within the reaction zone, are formed in the separating zone. Liquid aqueous hydrogen chloride phase is passed from the separating zone to the quenching zone and to the hydrogen chloride dehydrating means. The organic chloride-containing liquid phase is withdrawn from the separating zone as a final product.

In order to set forth more fully the nature of the invention, it will be described in detail in its application to the oxidation of hydrogen chloride in the presence of an olefinic hydrocarbon chlorine acceptor with reference to the attached drawing wherein the single figure represents more or less diagrammatically one form of apparatus suitable for executing the process of the invention.

Hydrogen chloride is passed through line 10 into a suitable reaction zone. The reaction zone may comprise any suitable reactor enabling intimate contact of catalyst and reactants, such as, for example, a reaction chamber 11. Oxygen taken from an outside source is passed through valved line 12 into line 10 leading into reaction chamber 11. The hydrogen chloride may be introduced into the reaction zone in substantially anhydrous state or may comprise water. Oxygen may be introduced into the reaction zone as relatively pure oxygen or in the form of an oxygen-containing gas such as air. A particular advantage of the invention resides in its ability to employ efficiently relatively pure oxygen and substantially anhydrous hydrogen chloride.

Within reactor 11 the hydrogen chloride and oxygen are contacted with a contact mass comprising as the essential activating ingredient a chloride of a metal of variable valence. Suitable metal chlorides comprise the chlorides of a metal of the first transition series of the elements of the periodic table, that is, the chlorides of a metal having an atomic number of from 21 through 30, both inclusive. These suitable metals comprise titanium, vanadium, chromium, manganese, iron, cobalt, nickel and copper. Of these metals iron and copper are preferred. Particularly preferred contact materials comprise those containing a chloride of copper as the active ingredient. In addition to the metal chlorides of the first transition series, the contact materials employed may contain suitable promoting or activating agents such as, for example, a chloride of cadmium, tin, antimony, the alkali and alkaline earth metals and the like. The metal chloride employed may be used as such or comprise suitable support or diluent materials such as, for example, adsorptive materials of siliceous and/or aluminous character and of synthetic or material origin. Particularly preferred diluent or support materials comprise alumina, silica, magnesia, silica-alumina, carbon, fuller's earth and the like.

In a particularly preferred method of executing the invention, the contact mass comprising the metal chlorides is employed in the fluidized or pseudo liquid state. Particularly preferred fluidized contact masses comprise a finely divided aluminous material impregnated with copper chloride. The catalyst mass is maintained in a fluidized or suspended state within the reaction zone by the gaseous reactants themselves and optionally by the additional use of an inert gas introduced from an external source by means not shown in the drawing and recycled from within the system. Catalyst is introduced into the system from a suitable source, for example, a catalyst storage drum 13 discharging into line 12.

The temperature within the reaction zone is maintained in the range of from about 300° C. to about 650° C. Under the above-defined conditions, the hydrogen chloride is oxidized with the formation of reaction products comprising chlorine and water. Since the reaction is highly exothermic no external application of heat is generally necessary. Heating means such as, for example, indirect heat exchanger 16 and optionally other heating means not shown in the drawing, are provided for providing the initial heat required in starting up the operation.

An organic chlorine acceptor is introduced into the system by means of valved line 17 leading into line 10. As chlorine acceptor any organic compound which is in the gaseous or vapor state and will react with chlorine at the conditions maintained in the reaction zone may be employed. A particularly desirable chlorine acceptor comprises the normally gaseous and normally liquid olefins such as, for example, ethylene, propylene, butylene and their homologues. Particularly preferred are the normally gaseous olefins. At the hydrogen chloride oxidizing conditions maintained in reactor 11, the olefin will react with the chlorine to form organic chloride reaction products consisting essentially of the chlorine addition product of the olefin. Thus in the detailed illustrative example of the invention, the use of ethylene as the chlorine acceptor will result in the reaction of chlorine with the ethylene to form alkyl chloride reaction products consisting essentially of ethylene dichloride. The reactions of the process executed in the presence of ethylene may be represented by the overall equation:

$$2C_2H_4 + 4HCl + O_2 = 2C_2H_4Cl_2 + 2H_2O$$

The particular preferential temperature within the permissible broad temperature range employed will vary some extent with the nature of the catalyst and organic chlorine acceptor employed. When using a finely divided copper chloride-containing catalyst and an olefinic hydrocarbon as the chlorine acceptor it is preferred to employ a temperature of, for example, from about 200° C. to about 400° C. and still more preferably from about 225° C. to about 300° C.

As is now well known, the oxidation of hydrogen chloride in the presence of the metal chlorides of variable valence will result in the presence of the metal chlorides in the reaction zone in a various state of valency. At the temperatures employed, a certain degree of volatilization of the metal chlorides employed will generally take place. Not only will such volatilized metal chlorides be removed from the reaction zone together with the gaseous products but physical entrainment of solid contact mass particularly when in the finely divided state will take place. Effluence from reactor 11 will therefore of necessity comprise not only the organic chlorides consisting essentially of ethylene dichloride, water, some chlorine and unconverted hydrogen chloride but substantial amounts of the contact mass employed. Such effluence from the reactor 11 may be passed through suitable catalyst separating means such as, for example, one or more cyclone separators such as cyclone separator 19 effecting the separation of a part of the entrained solid catalyst particles. Solid catalyst thus separated within cyclone 19 will generally comprise but a part of the entrained catalyst, and effluence leaving cyclone 19 through line 20 will comprise in addition to the reaction products and unconverted reactants a substantial amount of volatilized copper chloride and fluidized contact mass employed in reactor 11.

Effluence leaving cyclone separator 19 is passed through line 20 into a quenching zone. The quenching zone may comprise a chamber or scrubbing tower 21. Within scrubbing tower 21 the catalyst-containing reactor effluent stream is brought into direct contact with a counter current flow of cool aqueous hydrogen chloride introduced into scrubbing tower 21 by means of valved line 22. Substantially all of the contact mass introduced into scrubber 21 will be scrubbed from the reactor effluent stream and retrained by the aqueous hydrogen scrubbing medium introduced into and condensed within scrubber 21.

Liquid consisting essentially of aqueous hydrogen chloride and containing all of the contact mass introduced into the scrubbing zone will collect in the bottom of scrubber 21. Such liquid bottoms are taken from scrubbing tower 21 and passed by means of line 25 to line 10 entering reactor 11. At least a portion of the catalyst-containing aqueous hydrogen chloride stream thus passed through line 25 is passed through line 26 and introduced as catalyst cooling medium into reactor 11 at one or more points along the length thereof by means of valved lines 27, 28, and 29.

In accordance with the process of the invention temperatures within reactor 11 are additionally controlled by increasing the amount of catalyst recycled from the reactor 11 through lines 20, scrubber 21 and lines 25, 10 and 26. Control of the amount of catalyst recycled through scrubber 21 for quenching therein is obtained by varying the rate of flow of reactants, and optionally additional inert gas, through reactor 11. In general, the recycling of an amount of catalyst ranging from about 0.25 to about 5% by weight of the total catalyst in reactor 11 through scrubber 21 is found satisfactory. Higher or lower rates of catalyst recycle may, however, be resorted to within the scope of the invention. Such catalyst recycle reduces to a minimum amount the cool aqueous hydrogen chloride which must be recycled to the reactor as cooling medium. The process of the invention thus not only enables the efficient recycle to the reactor of catalyst in amounts substantially in excess of those normally encountered due to simple entrainment, but does so in a manner enabling substantial improvement in the method of heat removal from the reaction zone in the complete absence of the handling of dry catalyst streams or the passage of catalyst-containing streams through complex apparatus such as, for example, indirect cooling means and the like.

Reactor effluence, now substantially free of any solid contact mass, or components of said contact mass, is taken from scrubber 21 and passed through line 31, provided with cooling means such as, for example, an indirect heat exchanger 32, into a separating zone. The separating zone may comprise a chamber 33. In passing through exchanger 32, the stream is cooled to a temperature sufficiently low to condense substantially all organic chlorides.

Within separator 33, the reactor effluence is separated into a lower liquid phase comprising organic chlorides consisting essentially of ethylene dichloride, a supernatant liquid phase consisting essentially of aqueous hydrogen chloride, and a gaseous phase comprising some unconverted chlorine and any inert gases which may have been introduced into the system or which may have formed in the reaction zone.

Gases are vented from accumulator 33 through valved line 34. Such gases may be passed to suitable processing means not shown in the drawing to recover constituents such as any chlorine therefrom. The gases vented from separator 33 through line 34 may be passed in part, with or without further processing to the reaction zone through valved line 39.

The lower liquid phase, comprising ethylene dichloride is taken from separator 33 by means of valved line 35 as a final product. The organic chlorides thus removed from separator 33 through valved line 35 may be passed to suitable product separating and/or dehydrating means not shown in the drawing.

The upper liquid phase consisting essentially of aqueous hydrogen chloride in separator 33 is taken therefrom by means of line 36 and passed in part through valved line 37 provided with cooling means, such as a cooler 38, to line 22 leading into scrubber 21 to function as the scrubbing and cooling medium employed therein. The proportion of the aqueous hydrogen chloride thus diverted from line 36 into line 37 is controlled to provide not only sufficient scrubbing medium within scrubber 21 to effect the substantially complete removal of solid contact mass and components thereof from the reactor effluence and to convey the contact mass to the reactor 11, but to provide additional cooling medium for reactor 11 should this be required.

Aqueous hydrogen chloride withdrawn from separator 33 and not passed through line 37 is passed through valved line 41 to suitable water removing means. A valved line 42 is provided for the introduction of aqueous hydrogen chloride into the system. The water removing means may comprise a distillation column 43 provided with suitable heating means such as a reboiler or a closed heating coil 44. Within column 43, the aqueous hydrogen halide is subjected to extractive distillation employing as the auxiliary solvent a relatively concentrated aqueous solution of a hydroscopic salt such as, for example, calcium chloride. A vapor overhead consisting essentially of hydrogen chloride is removed from column 43. The hydrogen chloride thus separated is passed through line 47, provided with cooler 48, and passed into an accumulator 49. From accumulator 49, hydrogen chloride is passed through line 10 to reactor 11. A valved line 50 is provided for the introduction of hydrogen chloride from an outside source into line 10. Conditions within column 43 are preferably controlled to assure the obtaining of substantially anhydrous hydrogen chloride overhead therefrom. Additional water removing means such as, for example, contact with sulfuric acid, may be resorted to to effect removal of at least a part of any traces of water remaining in the hydrogen chloride stream flowing through line 10.

Bottoms from water removal column 43 comprising aqueous calcium chloride are passed through line 51 into suitable neutralizing means, for example, a chamber 52 containing suitable alkaline material such as calcium carbonate or the like to neutralize the acid content of the stream. The neutralized aqueous calcium chloride is then passed through suitable concentrating means such as, for example, a chamber 54 wherein water is removed by stripping and/or blowing. Water thus removed from the aqueous calcium chloride solution is eliminated from the system through stack 55. Means such as, for example, a hopper 56, is provided for the introduction of fresh calcium chloride into the system to aid in refortifying the calcium chloride stream. Concentrated calcium chloride solution is passed from chamber 54 through line 45 to the upper part of column 43. Although in the illustrative description of the invention, the use of calcium chloride has been shown as a preferred dehydrating agent for the hydrogen chloride to be recycled to the reaction zone, it is to be understood that the invention is in no wise limited to any specific method of removing water from aqueous hydrogen chloride.

The above illustrative description has stressed the use of a catalyst of the finely divided type. It is to be understood, however, that the invention may be applied to the use of any type of conventional hydrogen chloride oxidation catalysts comprising those employed as a stationary solid bed or as a molten fluid. In such methods of operation, the catalyst transported to the quenching zone will comprise the volatilized and physically entrained components of the catalyst bed or melt.

Although the detailed illustrative description of the invention has stressed the execution of the hydrogen chloride oxidation in the presence of an organic chlorine acceptor, the invention is not limited thereto. The process of the invention may be applied to the execution of hydrogen chloride oxidation in the absence of an acceptor and the resulting chlorine recovered from the system as the principal product. When thus operating in the absence of an organic acceptor for the chlorine the phases separated in separator 33 will generally consist of substantially only two phases; a gaseous phase consisting essentially of chlorine and inert gases, and a liquid phase consisting essentially of aqueous hydrogen chloride. The aqueous hydrogen chloride phase is removed from separator 33 through line 36 and passed in part to scrubber 21 and the remainder to column 43 substantially as described above in the description of the operation in the presence of a chlorine acceptor. The chlorine-containing gaseous phase is eliminated from separator 33 through line 34 and passed to conventional chlorine recovering and storing means.

The following example is illustrative of the efficiency with which olefin dichlorides are produced by the catalytic oxidation of hydrogen chloride in the presence of an olefin in accordance with the process of the invention:

*Example*

A gaseous mixture containing oxygen, hydrogen chloride and ethylene in a mol ratio of 1:3.3:1.65, respectively, is contacted with a fluidized, finely divided catalyst consisting of alumina impregnated with copper chloride, at the rate of 0.5 lb. of the charge mixture per lb. of catalyst per hour in a reactor at a temperature of 550° F. and at about atmospheric pressure. Gaseous effluence from the reactor contains 16.2 mol per cent organic chlorides consisting essentially of ethylene dichloride, 72 mol per cent water and 8.8 mol per cent HCl. In addition to gaseous reactants and reaction products a portion of the catalyst is taken from the reactor in admixture with the gaseous effluence at the rate of about 0.5% by weight of the total weight of catalyst in the reactor per hour. The catalyst-containing reactor effluence is passed into a quench tower wherein it is scrubbed with a stream of aqueous hydrogen chloride obtained within the system, thereby cooling the reactor effluence to about 240° F. and scrubbing substantially all catalyst therefrom. Catalyst-containing aqueous hydrogen chloride containing about 19.2% by weight of HCl and 1.6% by weight of solid catalyst is passed from the quenching tower into the reactor to maintain the operating temperature therein. Catalyst-free overhead taken from the quenching tower is passed through a cooler wherein it is cooled to a temperature sufficiently low to cool all the water content thereof (about 100° F.) and introduced into a separator. In the separator organic chlorides are separated as a liquid phase from a liquid aqueous hydrogen chloride phase and from a gaseous phase. The liquid aqueous hydrogen chloride phase is drawn from the separator and one-half thereof is passed to the quenching tower to function as the quenching and scrubbing medium therein and the other half is passed to a water-removing column. In the water-removing column, the aqueous hydrogen chloride produced is contacted with a 55% CaCl₂ solution to remove substantially all water therefrom. The dehydrated HCl is recycled from the water removing column to the reactor. The organic chloride phase withdrawn from the separator is found to contain 95 mol per cent ethylene dichloride. Overall ethylene dichloride yields of 90.7% and 97.7% are obtained based on ethylene and hydrogen chloride charged, respectively.

It is to be understood that the apparatus as shown may be modified as apparent to one skilled in the art without departing from the scope of the invention. Thus, though but one reactor is shown in the drawing, two or more reactors connected in series or parallel flow may suitably be employed. Such plurality of reactors may comprise reactors of the type heretofore disclosed as suitable for the execution of the hydrogen chloride oxidation reaction. For the sake of clarity in setting forth the nature of the invention, parts of apparatus such as, for example, pumps, compressors, valves, fractionators, condensers, catalyst storing means, and the like, not essential to a complete understanding of the invention have been omitted from the drawing.

The invention claimed is:

1. In a catalytic process wherein chlorine is produced by contacting oxygen and hydrogen chloride with a finely divided copper chloride-containing catalyst at hydrogen chloride oxidizing conditions in the presence of ethylene in a reaction zone, thereby simultaneously chlorinating said ethylene with said chlorine and forming reaction products comprising ethylene dichloride, water and hydrogen chloride, the steps which comprise passing said reaction products in admixture with a portion of said catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a catalyst-free gaseous phase comprising ethylene dichloride, water and hydrogen chloride in said quenching zone, and passing said catalyst-containing liquid phase from said quenching zone into said reaction zone.

2. In a catalytic process wherein chlorine is produced by contacting an oxygen-containing gas and hydrogen chloride with a catalyst comprising a chloride of a metal of the first transition series of the periodic table at hydrogen chloride oxidizing conditions in the presence of a normally gaseous hydrocarbon comprising ethylene in a reaction zone, thereby chlorinating ethylene with said chlorine and forming reaction products comprising ethylene dichloride, water and hydrogen chloride, the steps which comprise passing said reaction products in admixture with catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a gaseous phase substantially free of catalyst comprising ethylene dichloride, water and hydrogen chloride in said quenching zone, and passing at least a part of said catalyst-containing liquid phase from said quenching zone into said reaction zone.

3. In a catalytic process wherein chlorine is produced by contacting an oxygen-containing gas and hydrogen chloride with a finely divided copper chloride-containing catalyst at hydrogen chloride oxidizing conditions in the presence of a normally gaseous olefin in a reaction zone, thereby simultaneously chlorinating said olefin with said chlorine and forming reaction products comprising a chloro-hydrocarbon consisting essentially of the chlorine addition product of said olefin, water and hydrogen chloride, the steps which comprise passing said reaction products in admixture with a portion of said catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a catalyst-free gaseous phase comprising a chloro-hydrocarbon, water and hydrogen chloride in said quenching zone, and passing said catalyst-containing liquid phase from said quenching zone to said reaction zone.

4. In a catalytic process wherein chlorine is produced by contacting an oxygen-containing gas and hydrogen chloride with a copper chloride-containing catalyst at hydrogen chloride oxidizing conditions in the presence of an olefinic hydrocarbon in a reaction zone, thereby chlorinating said olefin with said chlorine and forming reaction products comprising a chloro-hydrocarbon consisting essentially of the chlorine addition product of said olefin, water and hydrogen chloride, the steps which comprise passing said reaction products in admixture with catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a gaseous phase substantially free of catalyst comprising a chloro-hydrocarbon, water and hydrogen chloride in said quenching zone, and passing at least a part of said catalyst-containing liquid phase from said quenching zone into said reaction zone.

5. In a catalyst process wherein chlorine is produced by contacting an oxygen-containing gas and hydrogen chloride with a catalyst comprising a metal of variable valence at hydrogen chloride oxidizing conditions in the presence of a hydrocarbon chlorine acceptor in a reaction zone, thereby chlorinating said hydrocarbon with said chlorine and forming reaction products comprising a chloro-hydrocarbon, water and hydrogen chloride, the steps which comprise passing said reaction products in admixture with catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a gaseous phase substantially free of catalyst comprising a chloro-hydrocarbon, water and hydrogen chloride in said quenching zone, and passing at least a part of said catalyst-containing liquid phase from said quenching zone into said reaction zone.

6. In a catalytic process wherein chlorine is produced by contacting oxygen and hydrogen chloride with a finely divided copper chloride-containing catalyst at hydrogen chloride oxidizing conditions in the presence of ethylene in a reaction zone, thereby simultaneously chlorinating said ethylene with said chlorine and forming reaction products comprising ethylene dichloride, water and hydrogen chloride, the steps which comprise passing said reaction products in admixture with a portion of said catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a catalyst-free gaseous phase comprising ethylene dichloride, water and hydrogen chloride in said quenching zone, passing said catalyst-containing liquid phase from said quenching zone into said reaction zone, passing said catalyst-free gaseous phase from said quenching zone through a cooling zone into a separating zone, separating a liquid phase comprising aqueous hydrogen chloride and a liquid phase comprising ethylene dichloride in said separating zone, and passing at least a part of said liquid phase comprising aqueous hydrogen chloride from said separating zone to said quenching zone.

7. In a catalytic process wherein chlorine is produced by contacting an oxygen-containing gas and hydrogen chloride with a finely divided copper chloride-containing catalyst at hydrogen chloride oxidizing conditions in the presence of a normally gaseous olefin in a reaction zone, thereby simultaneously chlorinating said olefin with said chlorine and forming reaction products comprising a chloro-hydrocarbon consisting essentially of the chlorine addition product of said olefin, water and hydrogen chloride, the steps which comprise passing said reaction products in admixture with a portion of said catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a catalyst-free gaseous phase comprising a chloro-hydrocarbon, water and hydrogen chloride in said quenching zone, passing said catalyst-containing liquid phase from said quenching zone into said reaction zone, passing said catalyst-free gaseous phase from said quenching zone through a cooling zone into a separating zone, separating a liquid phase comprising aqueous hydrogen chloride and a liquid phase comprising a chloro-hydrocarbon in said separating zone, and passing at least a part of said liquid phase comprising aqueous hydrogen chloride from said separating zone into said quenching zone.

8. In a catalytic process wherein chlorine is produced by contacting an oxygen-containing gas and hydrogen chloride with a catalyst comprising a chloride of a metal of the first transition series of the periodic table at hydrogen chloride oxidizing conditions in the presence of an olefinic hydrocarbon in a reaction zone, thereby chlorinating said olefin with said chlorine and forming reaction products comprising a chloro-hydrocarbon consisting essentially of the chlorine addition product of said olefin, water and hydrogen chloride, the steps which comprise passing said reaction products in admixture with catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a gaseous phase substantially free of catalyst comprising a chloro-hydrocarbon, water and hydrogen chloride in said quenching zone, passing at least a part of said catalyst-containing liquid phase from said quenching zone into said reaction zone, passing said catalyst-free gaseous phase from said quenching zone through a cooling zone into a separating zone, separating a liquid phase comprising aqueous hydrogen chloride and a liquid phase comprising a chloro-hydrocarbon in said separating zone, and passing at least a part of said liquid phase comprising aqueous hydrogen chloride from said separating zone into said quenching zone.

9. In a catalyst process wherein chlorine is produced by contacting an oxygen-containing gas and hydrogen chloride with a catalyst comprising a chloride of a metal of variable valence at hydrogen chloride oxidizing conditions in the presence of a hydrocarbon chlorine acceptor in a reaction zone, thereby chlorinating said hydrocarbon with said chlorine and forming reaction products comprising the resulting chloro-hydrocarbon, water, chlorine and hydrogen chloride, the steps which comprise passing said reaction products in admixture with catalyst from said reaction zone into a quenching zone, bringing said catalyst-containing reaction products into direct contact with liquid aqueous hydrogen chloride in said quenching zone, thereby forming a catalyst-containing liquid phase comprising aqueous hydrogen chloride and a gaseous phase substantially free of catalyst comprising said chloro-hydrocarbon, water, chlorine and hydrogen chloride in said quenching zone, and passing at least a part of said catalyst-containing liquid phase from said quenching zone into said reaction zone.

AVA J. JOHNSON.
ALEXANDER J. CHERNIAVSKY.

References Cited in the file of this patent

FOREIGN PATENTS

| Number | Country | Date |
|---|---|---|
| 430,539 | Germany | June 23, 1926 |
| 503,220 | Great Britain | Mar. 27, 1939 |